United States Patent [19]

Allison, III et al.

[11] Patent Number: 4,912,552
[45] Date of Patent: Mar. 27, 1990

[54] DISTRIBUTED MONITORING SYSTEM

[75] Inventors: Arthur W. Allison, III, Brinklow; Joseph A. Damoci, Beltsville; William H. Forlines, Gaithersburg; Carl B. Gipson; Matthew F. Kern, both of Laurel, all of Md.; David M. Myers, Martinsburg, W. Va.

[73] Assignee: Control Data Corporation, Minneapolis, Minn.

[21] Appl. No.: 183,113

[22] Filed: Apr. 19, 1988

[51] Int. Cl.$^4$ ............................................. H04H 9/00
[52] U.S. Cl. ........................................... 358/84; 379/92
[58] Field of Search ................. 358/84; 379/92, 106, 379/107; 455/2

[56] References Cited

U.S. PATENT DOCUMENTS

| | | | |
|---|---|---|---|
| 3,639,686 | 2/1972 | Walker et al. | |
| 4,044,376 | 8/1977 | Porter | 358/84 |
| 4,058,829 | 11/1977 | Thompson | 358/84 |
| 4,216,497 | 8/1980 | Ishman et al. | 358/84 |
| 4,331,974 | 5/1982 | Cogswell et al. | 358/84 X |
| 4,546,382 | 10/1985 | McKenna et al. | 358/84 |
| 4,566,030 | 1/1986 | Nickerson et al. | 358/84 |
| 4,567,511 | 1/1986 | Smith et al. | 358/84 |
| 4,605,958 | 8/1986 | Machnik et al. | 358/84 |
| 4,630,108 | 12/1986 | Gomersall | 358/84 |
| 4,633,302 | 12/1986 | Damoci | 358/84 |
| 4,658,290 | 4/1987 | McKenna et al. | 358/84 |
| 4,686,564 | 8/1987 | Masuko et al. | 358/84 X |
| 4,752,950 | 6/1988 | Le Carpentier | 379/106 |
| 4,779,198 | 10/1988 | Lurie | 358/84 X |
| 4,833,618 | 5/1989 | Verma et al. | 379/107 X |

FOREIGN PATENT DOCUMENTS

| | | | |
|---|---|---|---|
| 275328 | 7/1988 | European Pat. Off. | 358/84 |
| 87/07993 | 12/1987 | PCT Int'l Appl. | 379/107 |
| WO88/01117 | 2/1988 | World Int. Prop. O. | 358/84 |

Primary Examiner—Keith E. George
Attorney, Agent, or Firm—Frederick W. Niebuhr; Robert M. Angus; Edward P. Heller

[57] ABSTRACT

A system is disclosed which may be used for collecting television channel tuning data, household purchase data, VCR channel usage data and the like; on site at a plurality of preselected households, wherein the system concentrates and transmits the collected data to a central site in a fault tolerant manner, transparent to the occupants of the household. The novel system features a hub and spoke architecture for effecting communications between the central site and each household (remote site). The hub and spoke architecture at each remote site comprises a hub unit, and a set of spoke meters. The hub unit is adapted to be coupled, in a variety of ways, to a set of metering devices, one or more of which is coupled to one or more television receivers and/or cable television converters. Not all of the metering devices need be coupled to the television receiver or cable converter, e.g., stand alone purchase meters and wands may be coupled to the hub. The meters may be polled systematically, e.g. on a virtually continuous or periodic basis, by the hub, which then collects and concentrates the data acquired by each meter. As a result of this arrangement standard communications and data transmission "smarts" can be used at the meter level, meter storage requirements are kept to a minimum and no meter communications programming is required. Additionally, the hub can be easily reprogrammed by downloading control software from the central site without having to modify the meters.

50 Claims, 4 Drawing Sheets

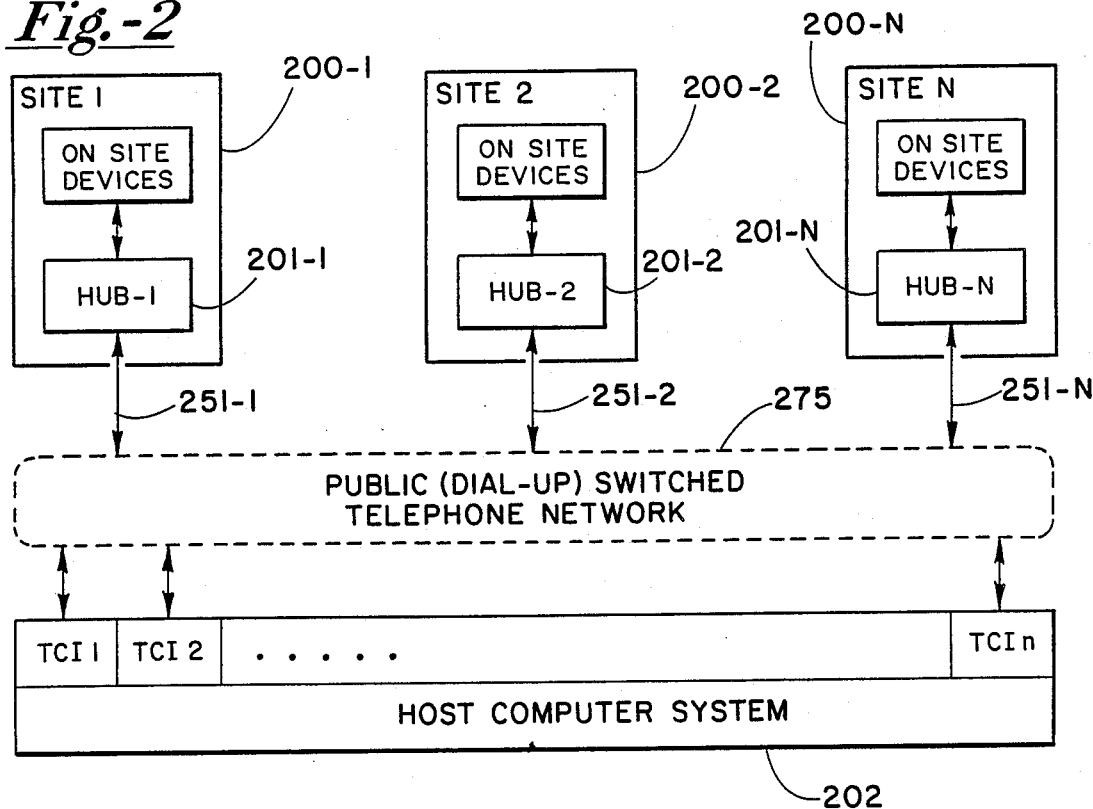
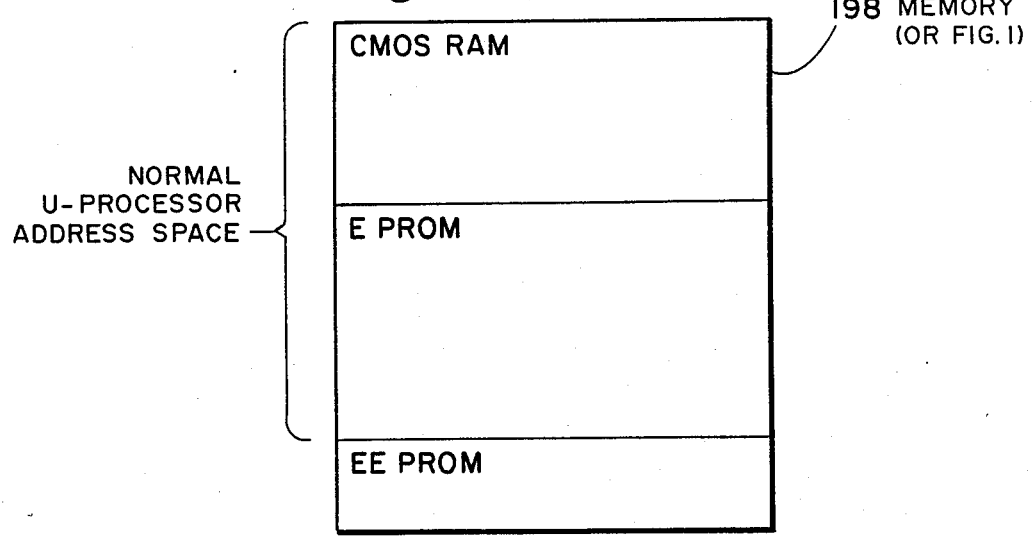

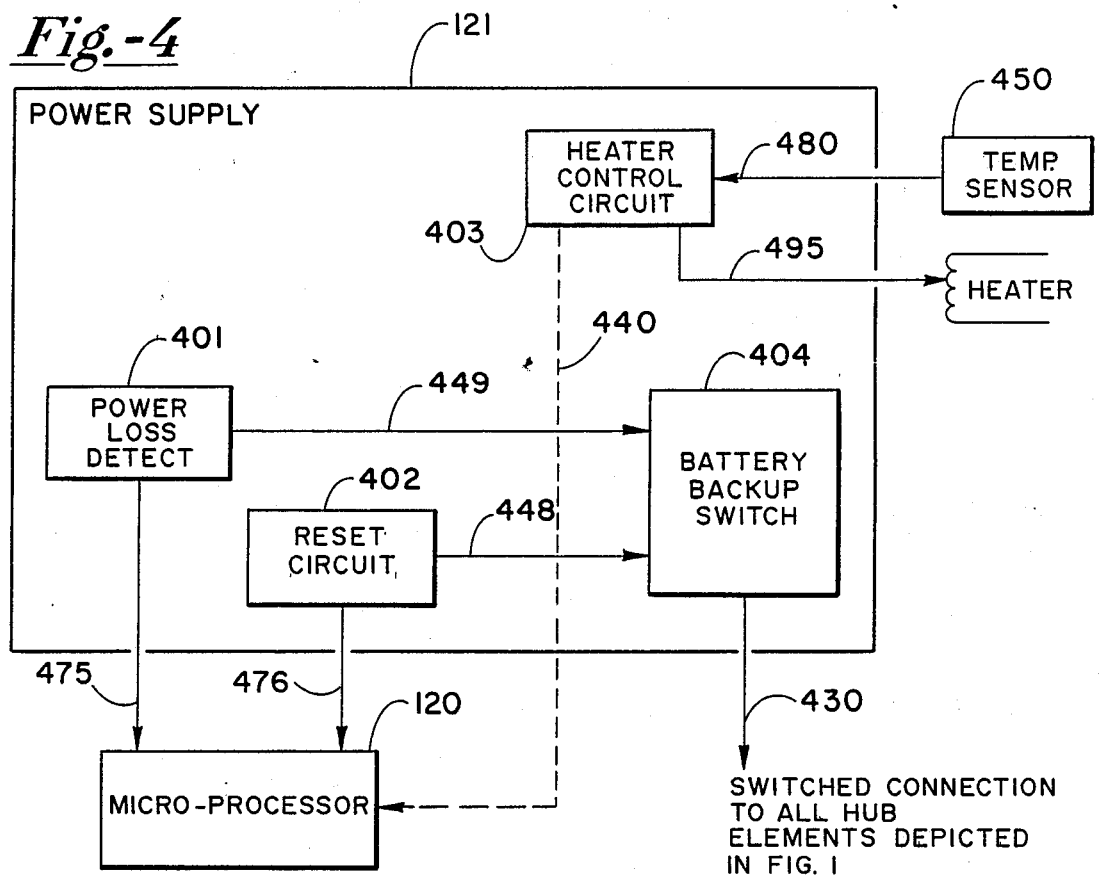

DISTRIBUTED MONITORING SYSTEM

BACKGROUND OF THE INVENTION

1. Field of the Invention

The invention generally relates to a system for monitoring, collecting and concentrating data on site at a plurality of remote sites, for transmitting the data concentrated at each site to a central location and for performing said monitoring, collecting, concentrating and transmitting functions in a manner that is transparent to persons located at a given remote site. More particularly, the invention comprises a distributed monitoring system for collecting television channel tuning data, household purchase data, VCR channel usage data and the like; on site at a plurality of preselected households, wherein the system concentrates and transmits the collected data to a central site in a fault tolerant manner, transparent to the occupants of the household.

2. Description of the Related Art

The prior art is replete with various systems and arrangements for monitoring viewing habits and product purchase preferences of television viewers, sometimes referred to hereinafter as panelists. The earliest such systems merely collected data on site for eventual manual collection as to the television channels viewed and the times of viewing for various panels of viewers in order to determine market share and ratings of various television programs. Later, systems came into being for use with cable television systems with two way communications over the cable system between the head end thereof and various cable subscribers. In such a system the television sets are typically interrogated periodically from this central location over the cable, with the channel selection and time information being sent back to the central location and logged for statistical compilation. Such systems have also been used in the past in so-called pay television systems in which billing information is sent over the cable system to a central location from the various subscribers to the pay television system. The prior art also includes such systems in which a memory means is provided at the remote location, e.g. at the television receiver, for accumulating data as to the channel being viewed and time. The accumulated data is then periodically transmitted over conventional telephone lines from the remote locations to the central location, by telephone calls initiated by either the remote stations or the central location.

Systems for remotely accumulating data regarding the habits of television viewers and their qualitative reaction to material have today become important from the standpoint of market research. For example, the effectiveness of television commercials can be monitored by correlating viewing of those commercials with subsequent purchase decisions made by panelists whose viewing habits are being monitored. One manner of achieving this which has been utilized in the past is to have the cooperating panelists keep a diary as to purchase of products. The purchase information recorded in these diaries is then correlated with the commercials viewed by those cooperating panelists. In an alternative arrangement disclosed in the prior art, in areas where universal product code automated check-outs are available, such as grocery stores and at the check-out counter, a cooperating panelist presents a card coded with a unique scanner panelist identification similar to the universal product code symbol on the products purchased. The store's computer can automatically retain such purchase data for subsequent transfer to a market research company computer data base for correlation with the data regarding the various panelists viewing of commercials. Such arrangements of course require cooperation of stores within the area of the panelist locations, and are therefore more suited for limited geographic groupings of panelists in a single locale or city, and are not readily applicable to a national assemblage of panelists extending across an entire country.

In market research relating to commercials and their effectiveness, it also is sometimes important to evaluate the effectiveness of alternative forms of a commercial. One way of achieving this in the context of a cable television system is to split the subscribers or panelists into two or more groups, and then show the alternative forms of commercials to the respective groups of panelists. Correlation of product purchase information regarding those panelists wit the forms of the commercials they viewed can then be used to assess the effectiveness of the various alternative forms of the commercial. The prior art also includes examples of systems wherein certain portions of viewing audience can be selected on a dynamic basis and furnished with substitute programming. Such a system is disclosed, for example, in U.S. Pat. No. 3,639,686 to Walker et al. In accordance with that system, an auxiliary television signal is broadcast which contains not only substitute programming, i.e. video signal information, but also control information such as pulse code information for remotely selecting panelists which are to receive the substitute programming. Digital address information is provided for each of the panelists, and the portion of the panelists which are to receive the substitute programming are selected by the pulse code information. The Walker et al patent notes that in selecting the panelists which are to receive the substitute programming, the number of categories available is dependent on the number of digital information bits that are incorporated in the system. A later U.S. Pat. No. 4,331,974 to Cogswell et al also discloses an arrangement for selecting portions of a viewing audience on a dynamic basis and furnishing those portions with substitute programming.

A more recent invention for data gathering with particular utility in market research type applications is described in U.S. Pat. No. 4,658,290 to McKenna et al. This patent teaches a system that includes a plurality of remote units which are controlled from a central location. Each of the remote units is attached to a television receiver which is generally but not necessarily attached to a cable system. Each of the remote units can function to determine which of several TV modes is in use as well as to store TV channel selector data, data from an optical input device, and/or data input by viewers representative of the composition of the viewing audience. The data is stored for either later collection by a portable data collector, or for direct transmission to the central location by each of the remote units. A video message for a TV viewer, such as a survey, may be transmitted from the central location and stored at the remote units, for later display on the TV receiver associated wit the remote units. Substitution of alternate programming information may also be achieved by the central control point on selected of the remote units.

The remote units described in the U.S. Pat. No. 4,658,290 are well known in the prior art and are typified by a channel meter, as described in U.S. Pat. No.

4,605,958 to Machnik et al and a VCR meter as described in U.S. Pat. No. 4,633,302 to Damoci.

In sum, a variety of television related metering devices and data collection systems are well known which are placed in a household, monitor TV channel changes, accumulate time on a given channel and other information, and communicate the data gathered to a central computer using dedicated telephone lines.

As TV technology rapidly advances and data gathering needs change (e.g., re cable, VCRs, active and passive people meters, single source purchase meters, etc.), meters change accordingly. Each new meter type must be separately accommodated at the central site, necessitating reprogramming of central site software. Additionally, each meter currently requires the built-in "smarts" needed for collection of data and transmission either to a central household collector or via the telephone lines to the central site.

It would be desirable to have a communications system that is flexible enough to support new meter types and new metering applications as they are identified.

It would also be desirable to have a communications system that is situated in such a manner as to eliminate the need for reprogramming central site software as new meter types and new metering applications come on line.

It would be further desirable to be able to direct a set of relatively "dumb" meters, each having limited data collection capabilities, using a single smart "hub" unit located at each remote site wherein the hub unit handles communication between the central site and the household via a household telephone and wherein communications between the hub and the meters may be accomplished over a variety of communication links such as hardwired, RF or carrier current links.

In effect, it would be desirable to structure a distributed system into a "hub and spoke" arrangement where the hub unit includes a sophisticated microprocessor and memory and the "spokes" are the communication links to the meters. The spoke meters could then be systematically polled and two way communication could be employed to not only permit the spoke meter to upload data, but allow the spoke meter to be remotely reprogrammed from the central site via the hub unit.

It would be further desirable if the monitoring system, structured in the indicated desirable way, collected data in a fault tolerant manner, e.g., could recover from remote location power failures, etc., and be operated transparently with respect to the panelists occupying a remote site household. For example, if the system hub was utilizing the telephone and a household occupant picks up the telephone to make a call, the system should be able to get off the telephone and keep track of the task it was last performing in order to pick up where it left off once the household telephone user, unaware that the system was even utilizing the phone, hangs up.

SUMMARY OF THE INVENTION

According to the invention, a distributed monitoring system is disclosed which, in at least one of a plurality of panelist households (remote sites), has the aforesaid desirable hub and spoke organization for communications between a central site computer, a hub unit located at the remote site, and a set of spoke meters also located at the remote site. In one embodiment of the invention, a hub unit is provided at each of a plurality of panelist locations. Each hub unit is adapted to be coupled to a set of metering devices, one or more of which is coupled to one or more television receivers at each panelist location, or to one or more cable television converters in the context of a cable television system. Not all of the metering devices need be coupled to the television receiver or cable converter For example, stand alone, special meters such as purchase meters and wands, may be coupled to the hub independent of any TV receiver or cable converter connection.

In one embodiment of the invention the coupling between the hub and spoke meters may take the form of an RF link, a hardwired connection, a carrier current link, or some combination of these links as desired by the system architecture. For example, a tuning meter may be coupled to the hub via an RF link while a purchase meter is hardwired to the hub unit.

In one embodiment of the invention the hub unit includes memory means, a clock, a backup power supply, means for interfacing with the household telephone in a manner transparent to the occupants of the household, and means for interfacing with the set of metering devices located at the remote site via any one of the previously mentioned communication links.

In one embodiment of the invention the spoke meters (set of meters) may include meters for monitoring and temporarily storing information regarding which of a plurality of television modes are in use, for obtaining viewer identification data, for injecting signals into the TV receiver's video stream, etc. With respect to the purchase type meters, data collection can be accomplished via means for optically scanning bar codes and the like and storing information regarding same. Such bar codes and the like can be representative of product purchase information or panelist responses to market research surveys and the like.

By utilizing the aforesaid hub and spoke system architecture, the spoke meters may, for example, be polled periodically or on a virtually continuous basis by the hub, which then collects and concentrates the data acquired by each meter. As a result of this arrangement standard communications add data transmission "smarts" can be used at the meter level, meter storage requirements are kept to a minimum and no meter communications programming is required. The hub is responsible for uploading data collected by a meter in a systematic fashion, for example, by using a preselected polling frequency. The hub also monitors meter failures and serves as the interface with the distant central site computer. The remote system can be easily reprogrammed by only downloading control software from the central site, without having to modify the meters themselves.

It is an object of the invention to provide a distributed monitoring system for monitoring, collecting and concentrating data at a plurality of remote sites, for transmission over telephone lines, in a manner which is flexible enough to support new meter types and new metering application without having to reprogram existing central site software.

It is further an object of the invention to be able to direct a set of relatively "dumb" meters, each having limited data collection capabilities, using a single smart "hub" unit located at each remote site wherein the hub unit handles communication between the central site and the house hold via a household telephone and wherein communications between the hub and the meters may be accomplished over a variety of communication links such as hardwired, RF or carrier current links.

It is still a further object of the invention to structure said distributed monitoring system into a "hub" and "spoke" arrangement where spoke meters are systematically polled by the hub unit, to collect and concentrate data and to employ two way communications between both the hub unit and spoke meters and hub unit and central site computer to permit the spoke meter to upload data to the hub for transmission to the central site and to permit the spoke meters to be remotely reprogrammed from the central site via the hub unit or to download data for display on a television set associated with a spoke meter.

It is yet another object of the invention to collect data in a fault tolerant manner and in a manner that is transparent to the occupants of a remote site household.

Other objects, advantages, and features of the present invention will become apparent to those skilled in the art from the detailed description of the invention to be set forth hereinafter, taken in conjunction with the accompanying Drawing.

BRIEF DESCRIPTION OF THE DRAWING

FIG. 2 depicts a plurality of remote sites, such as the site depicted in FIG. 1, coupled to the centralized host computer system via non-dedicated telephone lines.

FIG. 3 depicts the memory organization used in one embodiment of the invention.

FIG. 4 depicts an example of the power supply backup and heating control means utilized in one embodiment of the invention.

DETAILED DESCRIPTION

Figure 1:
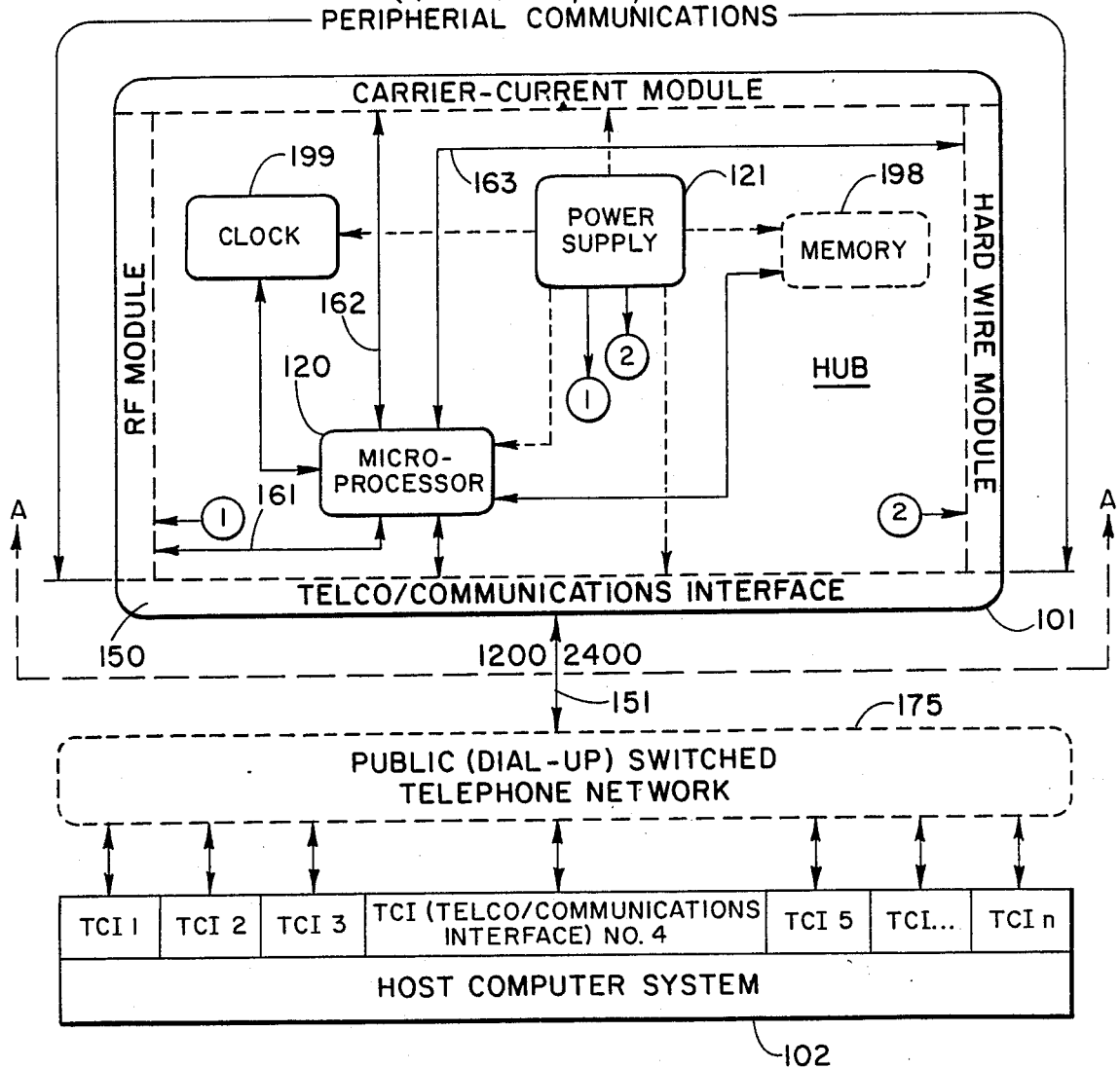
FIG. 1 depicts the novel distributed monitoring system architecture, shown to include a remotely located hub unit and a representative set of spoke meters, which may be coupled to the hub unit via a variety of depicted communication modules, wherein the system includes a bidirectional communications path between the depicted hub and a centralized host computer system which utilizes the public (dial up) switched telephone network over non-dedicated telephone lines.

FIG. 1 depicts the novel distributed monitoring system to be described in detail hereinafter.

The preferred embodiment of the invention is a modular system to facilitate easy expansion.

Conceptually, the system is one in which there are a number of different devices installed in any household (also sometimes referred to hereinafter as a "remote site"). Each device has a unique set of functions to perform. The core device in the household is the "hub unit", shown in FIG. 1 as unit 101, which acts as the interface between the household and the central data collection computer system, shown in FIG. 1 as host computer system 102. FIG. 1 includes dashed line A—A which indicates the boundary for equipment located inside a typical remote site. All of the equipment shown above dashed line A—A in FIG. 1 is located within the remote site.

Various peripheral units, examples of which are depicted in FIG. 1, are used to meter televisions, cable converters, product purchase data, viewer IDs, VCRs, etc. as required. Cable meter 110, TV meter 111, VCR meter 112, purchase meter 113, test set 114 and new device meter 115, are all depicted in FIG. 1 to illustrate a set of meters that could be coupled to hub 101 and to sets an VCRs located at the remote site. These peripheral units communicate with hub 101, which concentrates the generated data and forwards it to host computer 102. The flexibility and expandability of the system design is a result of the very non-specific nature of the interface between the hub and the peripheral units. New peripheral units can b introduced at any time and old peripheral units may be remotely reprogrammed and/or retired without decommissioning the entire system. For example, add-on memory can be introduced by coupling module 116 to hub 101 as shown in FIG. 1.

Host-hub communication takes place using the household telephone line. This is depicted in FIG. 1 as taking place via the hub telecommunication interface (150) (usually a modem), a data communication link 151, the public (dial-up) switched telephone network (175) and a set of telecommunications interfaces (TCI1–TCIn) with host computer 102. Each TCI-i supports communications between host computer 102 and a remote site. This is illustrated in FIG. 2 where N (a plurality of) remote sites (200-1 thru 200-N) are each shown coupled via their respective hub (receiver) devices (201-1 thru 201-N) to host computer 202 (similar to host computer 102 of FIG. 1) via bidirectional data communication links 251-1 through 251-N, telephone network 275 and TCI-i through TCI-N. The system depicted in FIG. 1 supports two means of establishing the connection between host computer 102 and household hub 101. The primary means is dial-out in which the household hub phones the central computer. Once the connection is established, the central computer takes control of the communication session. For installation and maintenance purposes, the hub can detect ring and answer an incoming phone call (dial-in) from the central computer. According to one embodiment of the invention this installation capability may be enabled by depressing a protected pushbutton in the hub. Another embodiment could have these features reversed, i.e., pushbutton for dial-out or have both on programmable schedules conditional upon host down loaded data.

Communication between the hub 101 and the spoke meters is achieved, according to the preferred embodiment of the invention, via plug-in communication modules. Examples of communication links which could be supported from a set of available communication links include hardwire, AC carrier current and RF communication links.

Each peripheral is uniquely addressable by the hub. The preferred embodiment of the invention supports a maximum of 126 peripherals with each hub, however a greater or lesser number of peripherals may be easily accommodated as the application dictates.

According to the preferred embodiment of the invention, the hub unit and each peripheral has a self test capability for all crucial system components. If the system is implemented in this manner, service calls at the remote site can be kept to a minimum. During any of the aforesaid communication sessions with host 102 the host computer can recover error logs maintained for each unit in the system. This feature will be described in greater detail hereinafter.

Also, further details regarding system fault tolerance generally will be set forth hereinafter. For now, suffice it to say that, according to the preferred embodiment of the invention, the peripheral units should be provided with sufficient power reserve capabilities to report to the hub if AC power is lost. The hub can thus discriminate between peripherals that do not respond due to loss of power and those that do not respond due to hardware failure. This capability would permit peripherals on switched outlets to effectively report loss of AC power.

Furthermore, according to the preferred embodiment of the invention, the hub contains an accurate time-of-day clock with a resolution of 0.01 second and an accumulated error of less than 1 second per day. The peripherals used in this embodiment can track elapsed time with 0.1 second accuracy. Obviously, greater or lesser resolution capabilities can be used as the application dictates without departing from the scope of the invention.

When peripheral units that generate time specific events (such as tuning meters and injection meters) include the 0.1 second resolution timers, polling these units causes the tenth count at the time of the event to be transmitted to the hub along with the current count of tenths of a second that the peripheral maintains. The hub can use tee difference between successive counts of tenths of seconds, for example, as an offset from the correct local time to determine the exact time at which the event occurred and store the data accordingly.

By sending a command from the host to the hub which causes an immediate response, one can measure the time elapsed between the sending and receipt of the response. Dividing this value in half enables extremely accurate time setting of the hub so that propagation delays between the host and the hub are accounted for. The propagation delay as measured by the host computer can be used by the host computer to compute an adjusted time of day storage in the remote site clock. This feature can be used to create a commercial monitoring peripheral device for precise measurement of commercial broadcast times.

The clock setting, according to the preferred embodiment of the invention, is performed by host compute 102 utilizing the communication links and telephone network shown in FIG. 1, i.e., interface 150 (coupled directly to microprocessor 120), link 151 and network 175 (coupled directly to host computer 102 via one of the TCI-i interfaces).

The purchase data meter included in some configurations of the system should collect UPC codes, EAN codes and JAN symbols. The preferred embodiment of the invention is a system that includes a handheld symbol reader that is capable of automatically decoding UPC symbols both with and without supplemental codes. However, the invention does not require the use of such a reader, requiring only the use of well known symbol reading devices (such as a WAND), as contemplated by the patents referred to hereinbefore, should a recording of purchases at the remote site be desired.

Looking at the system from a data collection point of view, data is collected from each peripheral unit and stored as separate information in the hub 101. Host computer 102 recovers each data set from hub 111 separately.

According to the preferred embodiment of the invention, television set tuning data is reported to the central site with 1 second resolution. This data includes date, time, channel tuned, CATV or off-air or auxiliary input selection. Viewer ID data is reported for each television set. This data includes household members and number of guests defined in the categories of sex and age. Purchase data is reported by UPC code; EAN code; JAN code o other commonly used code types.

VCR usage date typically collected includes data, time, duration and channel of record. VCR playback includes time and duration of playback.

The preferred embodiment of the invention provides for a limited degree of operation in some of the peripherals after power failure. This is to enable peripheral units powered from switched outlets to report o the hub that power has been lost.

The tuning meter/people meter used with the preferred embodiment includes an alphanumeric display capability of 9 lines by 20 characters which can overlap or substitute for a television picture. The tuning meter also includes volume control. System characteristics such as meter line display capability, inclusion of a volume control option, etc., are variables those skilled in the art will appreciate as possibly enhancing a particular version of the disclosed system, but are not options which expand or limit the scope of the invention.

Since hub 101 is the heart of the novel system, a detailed description of its structure and function will now be set forth. Hub 101 is the interface between the set of meters coupled to the hub and central computer system 102 of FIG. 1. As indicated hereinbefore, hub 101 continually polls all the peripheral units to monitor peripheral status and collect generated data. The peripherals are generally polled on a once per second basis, but some peripherals may be polled on a longer cycle. The cycle time can be varied dynamically to accommodate peaks in the communications traffic. Data is collected in real time and stored (concentrated) in the hub. At a predetermined time, typically every night, the hub uses the household phone line to call the host computer 102 and off-load the collected data.

A suitable hub unit can be based on an INTEL 80C186 microprocessor. This is illustrated in FIG. 1 as microprocessor 120 shown coupled to all of the other hub components depicted in FIG. 1 by solid bidirectional links. This CMOS microprocessor is capable of addressing up to 1 MEG of memory through an on-chip memory management unit, contains three 16 bit timer counters, two independent high speed channels, a programmable interrupt controller and a programmable wait state generator. In addition to this microprocessor, the illustrative hub unit includes:

1. EPROM memory expandable to a maximum of 128K (included in memory 198 of FIG. 1 to be described in greater detail hereinafter with reference to FIG. 3);
2. CMOS ram expandable to a maximum of 512K (also included in memory 198);
3. a time of day clock chip, shown in FIG. 1 as clock 199, accurate to within +/−1 second per day and a resolution of 1/100 of a second;
4. battery backup (included in power supply 121 of FIG. 1 and described in greater detail hereinafter with reference to FIG. 4) capable of maintaining the clock chip and CMOS RAM for a period of at least 1 month;
5. a 1K bit EEPROM (also included in memory 198);
6. an HDLC synchronous communications controller chip;
7. power up/down sequencing hardware for CMOS RAM protection;
8. a stall alarm which can be jumpered out of the circuit;
9. a total of 2 connectors for the modular insertion of various communication interface modules with some units containing a built in module;
10. a single connector for standard asynchronous communication with a diagnostic tester and development hardware (at TTL levels);

11. a Bell 212A modem board (which may be used as telco/communications interface 150 of FIG. 1) operating on switchable 5 and 12 volt supplies and capable of ring detection, dialing (both pulse and DTMF), off-hook detection and call progress tone detection; and 12. a separate power supply board with +5, +8 and +12 volt outputs. The illustrative power supply has the aforementioned battery backup with sufficient capacity to insure that the hub unit has the ability to communicate with the host once per day, 2 minutes per day, for power outages of up to one month duration. The mechanism by which this power supply is actually utilized is described hereinafter in the context of abnormal system conditions. The power supply is depicted in FIG. 1 as unit 121, shown coupled to all of the other hub components depicted in FIG. 1 via dashed power supply links.

To appreciate system operation the hub memory system, shown in FIG. 1 as memory 198, will be described with reference to FIG. 3, followed by a detailed description of hub/peripheral communications, hub/host communications, a detailed description of the hub power supply, suitable hub unit packaging, temperature operating range and hub responses to abnormal conditions which help achieve the system fault tolerance objective.

The memory of the hub can be viewed, with reference to FIG. 3, as being composed of tree distinct components. They are EPROM, battery backed up CMOS RAM and EEPROM. The EPROM and CMOS RAM reside within the normal address space of the microprocessor, while the EEPROM can be accessed by the microprocessor in a bit serial fashion. Jumpers are provided to allow the use of various capacity EPROM and RAM devices.

The preferred embodiment of the hub unit includes two sockets, along with appropriate jumper options, to accept most 27XX, 27XXX EPROMS. The actual EPROM used can be dictated by storage requirements. EPROM is used to dead start a program and should be located at the high end of memory as a reset goes to address FFFFD HEX.

As is well known and appreciated by those skilled in the art, firmware can be provided within the EPROM to allow the hub to power up from a "cold start" and perform internal self diagnostics as well as initial communications with central site computer 102. During such a communication session the central site can download an operating system, system configuration parameters and the peripheral communication drivers to the CMOS RAM of hub 101.

Upon a system reset or power-up, firmware resident within the EPROM can also be used to perform a sequence of diagnostic tests to not only verify the operational status of various hub components, but also the validity of programs and data resident within its CMOS RAM and EEPROM. If these tests pass, the hub simply commences normal operation. A failure of any of the diagnostic tests, in accordance with the preferred embodiment of the invention, will result in the hub performing an out-dial, if possible, to inform the host of its failure.

The illustrative hub unit also includes a total of four sockets, along with two jumpers, to accept either 32 or 128K by 8 static RAM devices. Each of these sockets is decoded to be contiguous. In addition, each RAM is provided with battery backup power and should be controlled by power up/down sequencing hardware to insure reliable data integrity.

The CMOS RAM memory serves several distinct functions within the hub. First, it is used to store the operating system which is transmitted to RAM by the central site computer 102.

Second, RAM contains the system configuration parameters and communication drivers (including survey and people meter screens) required by the hub for communication and control of the peripherals connected to the hub. Finally, RAM is used to log hub and peripheral events for transmission to the host computer.

The 1K bit EEPROM is used to store various critical system parameters. Normally this memory may only be read by the microprocessor. Writing to it is only allowed under certain specifically defined conditions to be described hereinafter. Both reading from and writing to the EEPROM is accomplished, according to the preferred embodiment of the invention, using a bit serial format.

The critical parameters stored in EEPROM include, for example, the serial number of the hub itself, a market group code, the main and backup phone numbers of the host computer and the timing and pulse/DTMF information required for the dialing process for each. Separate check bytes are also desirably maintained within the EEPROM for each of these items.

According to the preferred embodiment of the invention, data (other than the serial number of the hub) which is stored within the EEPROM may be altered by the host or tester. The serial number stored in the EEPROM may be altered only by the test set when locally connected to the hub.

Turning to hub/peripheral communications, it should be remembered that a main purpose of the hub is to concentrate data generated by itself and received from its peripherals and transmit this data to the host computer on a periodic basis. To communicate with peripherals, the hub is equipped with a high level data link control (HDLC) chip. Communications are configured in a synchronous half duplex format. In addition the hub includes two slots to accept any combination of a set of communication modules. Tee preferred embodiment of the invention supports RF, carrier current, and hardwire modules.

The hub is capable of determining which type of interface module (if any) is installed in each of its communication module slots. These slots are coupled to microprocessor 120 as shown in amended FIG. 1 via links 161-163. To facilitate this three connector pins have been defined which either will or will not be pulled to ground within the communication modules. This will allow expansion to up to 7 different types of modules in the illustrative hub being described herein.

The illustrative hub is also capable of automatically selecting baud rat for communications with its peripherals as a function of module type.

The hub unit used in the novel system functionally has the capability of individually activating the communication modules installed in it and the ability to place them in either transmit or receive mode. Various communications protocols can be supported with different downloadable software and communications modules. Furthermore, the hub scans each defined peripheral in the system on an adjustable time and priority basis. For example, some peripherals may be scanned at a rate of once every two seconds, others either more or less frequently with some peripherals having priority over others. The hub supports requests from peripheral drivers to alter the scan rate and priority level of the peripheral they support. With this ability, the scan rate of a peripheral may be optimized for current conditions.

The illustrative hub supports proper error detection and communication protocols to insure error free communications between itself and its peripherals, and supports communication with up to 252 addressable peripherals. In the preferred embodiment of the invention, address 00 is reserved for use by the hub, OFFH is not allowed, OFEH is reserved for the tester and OFDH is reserved as the install address.

The communication modules of the preferred hub are modular, i.e., have the same physical dimensions and are equipped with a standard connector adhering to a defined electrical interface. Such modules are completely interchangeable throughout the novel system When deactivated by the hub, the modules consume a minimum amount of power and do not in any way impair communications among any remaining modules in the system. Similarly a loss of power to a module does not impede communications among any remaining modules in the system. For example, an unpowered hardwire module would not load a hardwire communication path to the extent that communication among other peripherals using hardwire modules is impaired. A suitable physical size for the modules contemplated is approximately 3.0×5.0×1.0 inches. The communications modules are shown coupled to power supply 121 via dashed power supply links.

The hardwire module simply provides an interface to a twisted pair communication media. Data is transmitted and received at 5 volt levels. Two pairs of connect terminals are provided on the back plate of the module to allow for ease of hooking peripherals together.

The RF module simply provides an RF communication medium. A switch (or switches) are provided on these modules so that their communication frequency is selectable. This is to insure that two adjacent installations do not have crosstalk problems. If switch selection of frequency is not desirable, then modules of different frequencies can be assigned different module type codes.

The carrier current module simply allows communications over the household electrical wiring. In using these modules, consideration must be given to adjacent installation or other interference, and operation of a peripheral powered by a switched AC outlet. Four different carrier current module frequencies are supported in the preferred embodiment of the invention. Obviously, a fewer or greater number of frequencies could be supported.

Hub/host computer communications are accomplished over the public switched telephone network, using a Bell 212A compatible modem. The modem is contained within the hub (although it could be located externally) on a separate circuit board that also provides the capability of out-dialing in either pulse of DTMF formats, call progress tone detection and ring detection to support instances requiring in-dial. The telco/communications interface, 150, of FIG. 1 can be realized by the Bell 212A compatible modem. The Bell 212A protocol supports full duplex communications The hub/host communications can be configured as half duplex as well. For example, one system configuration envisaged has a communication rate of 1200 baud, 1 start, a stop and 8 data bits.

Ideally, the modem is integrated on a single chip and is linked to associated controller chips. Regardless of the modem chip set used, the modem should meet the following minimum criteria:
1. a bus interface controller;
2. full Bell 212A implementation;
3. call progress tone detection in hardware;
4. pulse and DTMF dialing;
5. answer and originate mode capability;
6. carrier detect capability at $-43/-48$ dBm, with 25 ms. on/off delay;
7. remote digital loopback ability; and
8. local analog loopback ability.

Since the hub will utilize the householders phone line for communication with the host, should the householder attempt to use the line while it is being used by the hub, the hub must be able to detect the attempted usage and abort its communication with the host. It therefore must relinquish the line to the householder. To allow this detection of an extension off-hook, a circuit is provided which causes the hub modem to go off-hook and leave an unusually high voltage on the telephone line. This varies from approximately 12 to 17 volts. When an extension goes into the off-hook state, it will drop the line to the usual 6 volts (approximately) causing a circuit to be actuated which disconnects the hub modem from the line.

In the event that an off-hook condition is sensed after the hub has established communication with the host, the hub will immediately return to an on-hook condition and log the aborted communication. After its out-dial retry time has passed the hub will attempt to re-establish communication with the host.

Whenever a special answer pushbutton on the hub is depressed to set an "answer arming" circuit, the hub will answer the first call received at the household within the next five minute period. During this time, the signal from the ring detection circuit will be monitored and if it goes active, the hub will immediately go off-hook and attempt to establish communications with the host. It is only during periods when the "arming" circuit is set that the hub will go off-hook in response to a ring signal. It will be ignored at all other times.

On phone answer or pulse dial circuits are provided to assure that electronic phones with unusually sensitive ring detection circuitry do not chirp momently. On pulse dial, this is done by slowing the rate at which current is introduced to the line. On phone answer an extremely fast ring detect/off-hook latch is used.

The hub operating modes are described next. There are two modes of operation for communication with the central site, in-dial and out-dial. Regardless of where the call is initiated, the communications protocols between the two devices should be identical. The host computer acts as the controller, i.e., during normal communication the hub only transmits in response to a packet from the host. This rule may be broken by the hub if it determines that it must transmit an end of transmission (EOT) packet and terminate transmission.

A point to note is that the modem operates in originate mode if it initiated the call, otherwise it operates in answer mode.

The out-dial sequence will be described first followed by a description of the in-dial sequence.

An out-dial sequence is initiated by the hub whenever the out-dial window opens or at the retry time following an aborted communication session. The out-dial sequence is composed of the following steps:

1. Check if the householder is currently using the phone. Abort and reschedule out-dial if in use. Log reason for abort in the hub's log;
2. Go off-hook and check for a dial tone. Abort if no present, reschedule out-dial and log the abort;
3. Determine which phone number to use (either primary or alternate) and perform the out-dial while monitoring off-hook. Abort if off-hook sensed, reschedule out-dial and log the abort;
4. Monitor call progress tones. Abort on timeout, off-hook, or busy. Reschedule out-dial and log abort;
5. Await carrier an enquire (ENQ) packet from the host. Abort on timeout or off-hook, reschedule out-dial and log abort; and
6. Process and respond to packets received from the host while monitoring off-hook and carrier. Abort on off-hook or loss of carrier, reschedule out-dial and log the abort.

Note that any abort results in an event being logged in the event log of the hub. A variety of different event codes can be employed so that it can be determined what caused a call to be aborted and during which portion of the out-dial or communication session it occurred. This provide valuable analysis information.

The time and number used by the hub when performing an out-dial to the host is controlled by the real-time clock in conjunction with a group of variables specified by the hub which may, for example, include:
1. an initial out-dial time, specified as year, month, day, hour, minute, second;
2. a primary retry interval specified in minutes and seconds. $I(p)$;
3. a secondary retry interval specified in minutes and seconds. $I(s)$;
4. a value indicating the number of retries to be performed using the primary and secondary phone number. $N(p)$;
5. a value indicating the number of retries to perform using the primary and backup phone number alternately. $N(a)$.

Upon the occurrence of the out-dial time, the hub will commence out-dialing to the host either until a successful communication session has been completed or until the complete retry sequence, such as the one set forth detailed below, has been exhausted.
1. $N(p)$ attempts at the interval specified by $I(p)$, using the primary phone number;
2. $N(p)$ attempts at the interval specified by $I(p)$, using the backup phone number;
3. $N(a)$ attempts at the interval specified by $I(s)$, using the primary and backup phone numbers alternately.

Note that it is the responsibility of the host to insure that the total span of retries does not exceed 21 hours. That is $2*(I(p)*N(p))+(N(a)*I(s))$ is less than 21 hours.

Upon exhaustion of the above sequence, the hub will reschedule its next out-dial time for 24 hours after the initial out-dial time.

The in-dial sequence will be described next. For in-dial (a ring) the hub should only respond if its "answer arming" circuit is set. If this is the case, the hub will answer immediately upon sensing the ring. It will then simply:
1. monitor for carrier and the ENQ packet from the host. Abort on timeout or off-hook and log the abort; and
2. process and respond to packets received from the host while montoring off-hook and carrier. Abort if required and log the abort.

The aborting of a communication session preferably causes the "answer arming" circuit to be cleared immediately.

Communications between the hub and host are accomplished by utilizing various defined packets of data as alluded to hereinbefore. The definitions of the packet formats and their contents can be varied to suit the application without affecting the scope of the invention.

Communications failures between the hub and host and the system response thereto, will now be described. The failures fall into two broad categories. Those that occur prior to the log-on of a hub to the host, and those that occur after.

Those that occur prior to a log on are: failure of the host to answer (line busy, etc.) and householder off-hook detected. In either case, the hub simply aborts its attempt, logs the failure, returns to an on-hook condition and reschedules another attempt at the retry time into the future.

Those that occur after the initial log-on, include a simple failure of communication (i.e., noisy phone line that eventually results in a communication timeout), abrupt broken communication (sensed by loss of carrier from host), or a householder off-hook detected. In all cases, the hub will return to an on-hook condition, log the failure and reschedule another attempt at the retry time into the future.

The hub power supply (unit 121 of FIG. 1) will now be described. The power supply for the illustrative hub is designed to provide +5, and +12 volts and have battery backup capacity to maintain these voltages as well as provide an AC loss signal to the microprocessor board so that it may detect both loss and restoration to the AC line and incorporate the necessary components to provide carrier current coupling to the AC line.

All power supply components, with the possible exception of the batteries required for backup power, are referably mounted on a single circuit board. For safety and RFI reasons, the components on this board should be physically placed as to segregate those connected on the AC line from the remaining components. These components include the power supply transformer, line circuit breaker and carrier current coupling components.

Battery backup of the two voltages can be provided by a lead acid battery. The required charging circuits should also be included.

To attain voltage regulation at a desired level of accuracy and to minimize battery cost, three-terminal IC regulators should be utilized.

A suitable power supply specification is as follows:
1. Nominal Load: 12 volts at 200 ma., and 5 volts at 450 ma., (all of which are switchable from the time of day clock when AC power is off), and a separate unswitched +5 volt supply at 10 ma. for memory and time of day clock retention (1 ma. typical).
2. AC line input: 90–135 volts, 60 Hz, 15 watts nominal at 115 volts, 25 watts maximum.
3. Load regulation:
    switched 12 volt output, +/−1 volt, 50 ma to 200 load including backup;
    switched 5 volt output, +/−200 mv. 20 ma to 500 ma load including backup;
    unswitched +5 volt output, +200/−500 mv., 0.1 to 10 ma, including backup.

4. Battery charging: automatic and regulated over a 100 to 135 volt AC input range.
5. Backup capability (all outputs): 6 hours minimum (for +5 volts) at 100 ma load 1 month minimum for unswitched +5 volts at 200 microamp load.
6. ESD: sparkgap from AC line to chassis at 5000 volts nominal.
7. Carrier current: line coupling components on board.
9. AC line protection: AC circuit breaker, PC mounted, accessible reset.

As far as packaging is concerned, the illustrative hub may be packaged in a metal enclosure 14 inches wide, 6 inches deep and 3 inches high. It has rubber feet on two sides so that it can be set on either of two faces. Means are provided such that it may be hung on a vertical surface.

The illustrative hub is provided with a 6 foot AC line cord with a 3-prong electrical plug. The hub power supply is protected by a circuit breaker. The actuator of the breaker is red, located near the line cord and projects through the case.

A standard 6 conductor phone jack is provided for connection to the household phone line. The button that is actuated to arm the hub to intercept an incoming telephone call is white and located near the telephone jack.

Two LEDs are viewable on the exterior of the hub. One LED indicates the presence of AC power and the other LED is illuminated when the hub is armed to intercept an incoming phone call.

Obviously the use of the LEDs, colored actuator buttons, etc. are illustrative only and can be modified, eliminated or supplemented to suit the application of the hub unit.

According to the illustrative embodiment of the invention, a standard 4 conductor phone jack is provided for connection of the hub to test set 114 shown in FIG. 1.

The preferred embodiment of the invention includes a hub unit that will operate over the temperature range −30 degrees C. to +50 degrees C. when AC power is present. Since some of the electronics within the hub may not be rated for operation below 0 degrees C., an internal heater has been provided to ensure that these components are not subjected to temperatures below their operations range.

The heater is not operational when A power has failed (in the illustrative hub) Therefore, if AC power fails and the ambient temperatures of the hub falls below 0 degrees C., a thermal sensor is provided to prevent the microprocessor within the hub from powering up. However, all memory and the time-of-day clock continue to be maintained under these conditions. When AC power is restored, the normal operation will resume after the heater has armed the hub electronics to 0 degrees C. An illustration of how power supply 121 and microprocessor 120 cooperate to achieve the functions described immediately hereinabove is disclosed with reference to FIG. 4.

FIG. 4 depicts power supply 121 as including power loss detection circuit (PLDC) 401, reset circuit 402, heater control circuit 403 and battery backup switch 404. Shown directly coupled to power supply 121 are microprocessor 120 and temperature sensor 450. A switched connection to hub memory, microprocessor, communications modules, telco/communications interface (modem) and clock, of FIG. 1, is also shown in FIG. 4 via battery backup switch 404 and link 430.

According to the example being set forth with reference to FIG. 4, power loss detection circuit 401 can signal microprocessor 120, via link 475, to record the time of a power failure in memory and order microprocessor shut down. Circuit 401 also enables battery backup, via switch 404, upon detecting a power failure by turning the battery backup switch "on" via link 499.

A complimentary function is performed by reset circuit 402, i.e., to inform microprocessor 120 (via link 476) that power is back on, to order the microprocessor to restart and to record restart time, and to reset battery backup switch 404 via link 198.

Heater control circuit 403, shown coupled to temperature sensor 450 via link 480, is operative to turn on the heater referred to hereinabove, via link 495, if power is on and temperature falls below a predetermined level. The heater can be located anywhere within the hub where it can conveniently heat the sensitive components (typically clock related components) referred to hereinabove. Heater control 403 will also prevent battery backup if power is off and the temperature is below the predetermined level by preventing microprocessor 120 from powering up as indicated hereinabove. FIG. 4 depicts the signal to inhibit microprocessor 120 from powering up as being communicated from heater control circuit 403 via dashed link 490.

All of the circuits depicted in FIG. 4 are shown for the sake of illustration only, it being well within the knowlege of those skilled in the art to implement the heating and battery backup functions described hereinabove in a multiplicity of ways using off-the-shelf circuit components.

To conclude the detailed description of the invention, a description of how the novel system responds to abnormal conditions, will now be set forth.

One of the tasks performed upon system reset, as well as on a routine basis by the operating system, is the monitoring and verification of various critical portions of the software within the hub. Verification checks are performed on the contents of the EPROM, the EEPROM contents, clock chip time, the event memory sector allocation map and portions of the operating system. In addition, the hub must handle communication failures, either with its peripheral or the host, in a logical and well defined fashion.

System memory failures will be addressed first.

As indicated previously, the systems CMOS memory is utilized for a variety of functions, the more critical of which will be monitored for validity of content on a periodic basis. These areas are the sector allocation map, event logs and critical portions of the operating system itself. In addition, other memory components are part of the system memory and the critical functions present in hem are monitored as well.

In particular, with respect to EPROM failure, two check codes are maintained within the systems EPROM so that its integrity can be verified. One check code is used to verify those sections of code required to support a communication session with the host and the second is used to verify various utility routines resident in the EPROM. A check of the EPROM is, according to the preferred embodiment of the invention, only performed following a hardware reset.

If it is determined that the utility routine portion of the EPROM is no longer valid, an appropriate error flag will be set and the unit will attempt to perform an immediate out-dial to the host computer and inform the host of its conditions. If however, it is determined that the communication support code in the EPROM is invalid, it will simply place itself in a "sleep" mode awaiting a resurrection by human hands.

If it is determined that the operating system is no longer valid, the hub will simply perform a software reset. The reset will verify invalid operating system status and the hub will set the appropriate status flags and attempt to communicate with the host (assuming the EEPROM data is still valid).

Another key memory to monitor is a hub/peripheral configuration table. The hub/peripheral configuration table is an area of memory which contains the map to correlate the physical address of devices to be polled, with their logical device types and the medium over which they are to be polled. This area of memory should be checked for validity both periodically and upon system reset. Should it be found to be invalid, the hub sets a status flag and performs a software reset. It will then initiate a out-dial to the host. Once communication is established, the host may request this table and correlate it with that stored in its data base. It will then be the responsibility of the host to download a new table. Note that polling of the peripherals should be suspended until a new table has been received from the host.

Eventlog failure should also be monitored. The event log of each peripheral in the preferred embodiment of the invention, has an associated block check code. This code should be routinely verified and updated during the logging process. Should it be determined that the block check code is invalid, an appropriate status flag can be set, an event logged in the log in question and a new block check code generated.

If, after the above actions, the block check code remains valid, the hub continues routine normal operation.

If the refreshed block check code cannot be verified, a permanent memory failure will be recorded for the hub. A log for the peripheral in question will be moved to alternate memory, a new block check generated and the condition reported.

Clock chip time failure should also be monitored. The time in the clock chip should be verified upon a system reset and on a second by second basis by the operating system. If the time is found to be invalid (out of range) the hub, in the preferred system will:
1. reset the time to a default value (JAN 1, 1987, 00:00:00 for example);
2. log a time failure event (utilizing the last valid time read) in event logs of the hub and all peripherals that require time stamping of their events;
3. set a status flag indicating the failure;
4. perform a verification of the contents of the EEPROM and if valid, begin attempts to communicate with the host; and
5. continue normal operation and event logging using the new time base (at least until a new time is loaded by the host).

Upon established communications with the host, the host would determine the failure and reset the time in the clock chip. After resetting the time in the clock chip, the hub would ascertain if resetting of the time was required as a result of a time failure. If this was the case, the hub would log a special event indicating this fact in all event logs of peripherals requiring time stamping In this way any event logged between the time of the clock time failure and its reset will be bounded by two unique event codes. These codes would be detected in the event logs obtained by the host and with proper correlation the host would be able to determine the true times of the events and thus no data loss would occur.

Finally, with respect to memory failure checks, the EEPROM should be monitored. If upon system reset or during periodic checks by the operating system it is determined that the contents of the EEPROM are invalid, the preferred hub will set a status flag indicating EEPROM failure and then simply resume normal operation with the exception. At the next occurrence of out-dial time, the action taken by the hub will be determined by what data within the EEPROM has failed. If the serial number and at least one of the phone numbers is intact, a out-dial will be performed using a valid phone number. Upon establishing communications with the host, the host would ascertain and re-load the correct data. If at out-dial it was determined that either the serial number of both phone numbers within the EEPROM were invalid, the hub would not perform a out-dial. At this point, it would be up to the central site operators to identify that the hub is failing to call in. It will then be necessary to arm the EEPROM circuit as described previously and have the host call the unit. Upon requesting status from the hub, the host will determine that the EEPROM data is invalid and will then attempt to re-establish it. Regardless of whether or not this task was completed successfully the host can obtain event log data if it so desires. In essence, failure of the EEPROM will not affect the operational ability of the hub with the exception of its out-dial capability.

It will be understood by those skilled in the art that the described monitoring and recovery sequences were set forth for the sake of illustration only and could be modified to suit a particular application and/or desired level of fault tolerance without departing from the scope or spirit of the invention.

In illustration of hub fault detection and recovery techniques for loss of AC power and of how the system may be globally reset will now be set forth.

The power supply within the preferred hub contains an AC detection circuit which signals the microprocessor of 120 VAC being lost. Upon sensing the loss, the illustrative hub scans all peripherals as rapidly as possible (i.e., normal scan rates will be ignored) to determine if the power outage is local to itself or is "global" in nature. The results of this scan are logged, status flags set appropriately, a "wakeup" time equal to the next out-dial time is loaded into the real time clock chip and upon completion of this, the system performs a power supply shutdown.

The hub can remain shutdown (note that the CMOS RAM and the real time clock are maintained on battery backup) until the system supply voltage is restored either as a result of restoration of 120 VAC or the "wakeup" time occurring. Restoration of the 120 VAC shall cause an event to be logged indicating time of return.

If the system supply is restored as a result of wakeup time, the hub can make a single attempt at communicating with the host. If successful, the hub will simply inform the host of its condition and upon completion of communications return itself to a shutdown condition. If unsuccessful, the hub can also return itself to a shutdown state. No further wakeup time will be scheduled according to the illustrative embodiment of the invention.

If the system supply returns as a result of restoration of 120 VAC, the hub can schedule a out-dial at the next possible out-dial time (if it has not already passed) and resume normal operation. If the out-dial time has passed, the hub will commence attempts to communicate with the host. Note that appropriate logging of the above will be performed for analysis by the host.

Finally, with respect to reset, a hardware reset only occurs, according to the preferred embodiment of the invention, upon restoration of 120 VAC, manual operation of the reset pushbutton, a system stall or the occurence of the wakeup time that had been previously stored in the clock chip. Any of these events causes the memory to be configured with the EPROM enabled. Execution begins at address zero where calls are made to the various verification routines resident in the EPROM. One of the main areas that is verified is the operating system which is reside in RAM. If it is determined that the operating system is no longer valid, the operating system will be overwritten with the contents of the EPROM, the EPROM will then be disabled and out-dial attempts will be commenced. If it is found that the operating system is intact and other verification check pass, the EPROM will be disabled, a reset event will be logged in the log of the hub and normal operation will resume. Upon resuming normal operation, a comparison will be performed between the current time and the out-dial window open and close times. If the current time precedes the out-dial window open time, no special action will be taken. If this is not the case, the hub will begin repeated out-dials in an attempt to establish communications with the central site.

Failure of any of the verification will result in the actions being taken that are detailed hereinbefore.

With respect to software reset, it should be noted that initiation of a software reset does not result in the automatic enabling of the EPROM. As with the hardware reset, various verification checks are performed with one of the main check being the operating system itself. Should the operating system be found to be invalid, the software will enable the EPROM and jump to address 0 (in essence it performs a hardware reset). Aside from enabling the EPROM if required, the software reset is virtually identical to tee hardware reset.

Finally, with respect to system stall, the occurrence of a stall will, according to tee preferred embodiment of the invention, cause a hardware reset, followed by the logging of an appropriate event in the event log. The action taken by the reset routine is as set forth hereinbefore.

The foregoing description of a preferred embodiment of the novel distributed monitoring system, including its novel hub and spoke architecture, has been presented for the purposes of illustration and description only. The description is not intended to be exhaustive or to limit the invention to the precise form disclosed, and obviously many modifications andvariations are possible in light of the above teaching. For example, since the disclosed system supports the systematic transmission of concentrated data, whether periodic or aperiodic, between the hub to the host computer, unusual events in addition to emergency calls can be supported in alternate embodiments of the invention. Also, diverse types of self-contained receivers, including but not limited to TV broadcast receivers, may be monitored via systems that are configured in accordance with the teaching set forth herein. Still further, an alternate embodiment of the invention can support data transfer between two meters (or indeed any set of meters) via the hub.

The embodiment and examples set forth herein were presented in order to best explain the principles of the instant invention and its practical application to thereby enable other skilled in the art to best utilize the instant invention in various embodiments and applications, with various modifications as are suited to the particular use contemplated. Those skilled in the art will readily appreciate that the stated objectives of the invention have been met.

It is intended that the scope of the instant invention be defined by the claims appended hereto.

What is claimed is:

1. A distributed monitoring system which monitors data associated with a first set of devices, including at least one self-contained receiver, which collects and concentrates monitored data on site at a plurality of remote sites, and which systematically transmits concentrated data from said remote sites to a central site, comprising:

a host computer means, including means for receiving transmitted data, located at said central site;

a first means, coupled to said first set of devices being monitored, for monitoring, collecting and concentrating said data on site at each of said plurality of remote sites and for systematically calling out and transmitting concentrated data to said means for receiving in a manner that is transparent to any occupants at a given remote site; and a second means, coupled between said host computer and said first means, for providing a bidirectional communications interface between said first means and said host computer;

wherein said first means comprises a second set of devices, including at least one metering device, for monitoring data associated with said first set of devices; and a hub means, including interface module means which facilitates selectively coupling said hub means to said second set of devices, for collecting, concentrating and transmitting monitored data; and wherein said hub means further comprises a memory means including a CMOS static RAM for storing an operating system capable of being furnished to said hub means by said host computer via said second means; a microprocessor coupled to said memory means, said interface modules and said second means, for controlling the collection and concentration of data from said second set of devices and for controlling communications with said host computer via said second means and a time of day clock, coupled to said microprocessor, for synchronizing the operation of said microprocessor and said memory means, and for time stamping events to be logged in said memory means by said microprocessor.

2. A distributed monitoring system as set forth in claim 1 wherein said second means further comprises telecommunications interface means, and a non-dedicated telephone line at each of said remote sites, for coupling said first means to said host computer utilizing the public (dial-up) switched telephone network.

3. A distributed monitoring system as set forth in claim 2 which further comprises means for utilizing the non-dedicated telephone line at each of said remote sites in a manner that is transparent to any other user of the telephone line at a given remote site.

4. A distributed monitoring system as set forth in claim 1 wherein said interface module mean are operative to permit said hub unit to be coupled to said second set of devices via at least one type of communication link from a set of communication links including RF, hardwire and carrier current links.

5. A distributed monitoring system as set forth in claim 1 wherein said first set of devices includes at least one TV broadcast receiver.

6. A distributed monitoring system as set forth in claim 5 wherein said second set of devices further includes at least one TV monitoring device.

7. A distributed monitoring system as set forth in claim 5 wherein said second set of devices includes at least one cable metering device.

8. A distributed monitoring system as set forth in claim 1 wherein said first set of devices further comprises at least one video cassette recorder (VCR) device and said second set of devices includes at least one VCR metering device.

9. A distributed monitoring system as set forth in claim 1 wherein said second set of devices further comprises a purchase data metering device suitable for reading product bar codes.

10. A distributed monitoring system as set forth in claim 1 wherein said microprocessor collects data from said second set of devices by systematically polling at least one of the devices in said second set of devices.

11. A distributed monitoring system as set forth in claim 1 wherein at least a part of the processing control function for at least one device in said second set of devices is performed by said hub means.

12. A distributed monitoring system as set forth in claim 1 further comprising:
(a) means for measuring the elapsed time between the sending to said hub means of a host computer command and the receipt by said host means of a response to said command; and
(b) means for setting said time of day clock as a function of said elapsed time to eliminate propagation delay 13. A distributed monitoring system as set forth in claim 1 wherein the hub means scans each device of said second set of devices according to an adjustable scanning frequency.

14. A distributed monitoring system as set forth in claim 1 wherein said CMOS static RAM is further operative to store system configuration parameters and drivers to facilitate communications between said hub means and said second set of devices, and is also operative to store event logs generated by said hub means and said second set of devices for subsequent transmission to said host computer by said hub means.

15. A distributed monitoring system as set forth in claim 14 further comprising means for segmenting and allocating said CMOS RAM.

16. A distributed monitoring system as set forth in claim 15 wherein said memory means further comprises, EPROM for storing data which permits said hub means to perform initialization, self diagnostics and hub/host computer communication tasks.

17. A distributed monitoring system as set forth in claim 16 further comprising means for performing memory mapping of said EPROM and said CMOS RAM.

18. A distributed monitoring system as set forth in claim 17 wherein said memory means further comprises EEPROM for storing critical system parameters.

19. A distributed monitoring system as set forth in claim 18 further comprising means for operating said hub means in a fault tolerant manner.

20. A distributed monitoring system as set forth in claim 19 wherein said means for operating said hub means in a fault tolerant manner further comprises:
(a) an AC power loss detection circuit for signalling said microprocessor of AC power loss; and
(b) battery backup power supply means activated upon detection of AC power loss by said microprocessor.

21. A distributed monitoring system as set forth in claim 20 wherein said means for operating said hub means in a fault tolerant manner further comprises a heater element for maintaining hub means circuit components above a preselected temperature level.

22. A distributed monitoring system as set forth in claim 21 further comprising reset means for performing system reinitialization.

23. A distributed monitoring system for collecting television channel tuning data, household purchase data, VCR channel usage data and the like, a portion of said system being located on site at each of a plurality of preselected households, wherein the portion of the system located remotely automatically monitors, collects, concentrates and systematically calls out to transmit concentrated data to a central site, in a fault tolerant manner that is transparent to the occupants of each household;
said remote portion of said system comprising a hub unit and at least one spoke meter, said hub unit performing said data collection, concentration and transmission functions and each of said spoke meters performing said monitoring function;
said hub unit being adapted to be coupled to a given one of said spoke meter devices via any one of a set of communication links including RF, hardwire and carrier current links; and
wherein said hub unit systematically polls each of said spoke meter devices at a scanning frequency selected in accordance with each said spoke meter device, in order to collect data from said devices and, upon collecting and concentrating data from each spoke meter, systematically attempts to transmit concentrated data to said central site.

24. A distributed monitoring system as set forth in claim 23 wherein at least one spoke meter is a member of a set of spoke meters that includes a stand alone purchase data meter, a TV meter, a cable meter and a VCR meter.

25. A distributed monitoring system as set forth in claim 23 wherein said hub unit is programmable and may be reprogrammed by downloading control software from said central site without having to modify said spoke meters.

26. A distributed monitoring system as set forth in claim 23 wherein at least one of said set of spoke meter devices is remotely programmable.

27. A distributed monitoring system as set forth in claim 25 wherein each hub unit is operative to utilize a non-dedicated telephone line at each remote location, in a manner that is transparent to any other prospective user of said non-dedicated telephone line, to facilitate bidirectional communications with said central site over the public (dial-up) switched telephone network.

28. A distributed monitoring system as set forth in claim 27 which is operative to systematically perform an out-dial sequence in order to establish communication over said non-dedicated telephone line with said central site and which is further operative to be responsive to an in-dial sequence initiated at said central site and received over said telephone line, to facilitate receiving inquires and data from said central site.

29. A method of monitoring data generated at a plurality of remote sites utilizing a distributed monitoring system that includes a host computer located at a central site, comprising the steps of:
   utilizing first means, located at said remote site, to monitor, collect, concentrate and transmit data to said host computer by calling out to said host computer in a manner that is transparent to any occupants at a give remote site;
   organizing said first means in a hub and spoke arrangement wherein a first portion of said first means monitors the data generated at each remote site and a second portion of said first means, also located at each remote site, serves as both an interface between said first portion of said first means and said host computer and as a programmable means for collecting, concentrating and transmitting the data being monitored;
   utilizing a set of spoke meters to perform the monitoring function of said first portion of said first means;
   utilizing a programmable hub unit, to which said spoke meters are coupled, to perform said interface, data collection, concentration and transmission functions of the second portion of said first means;
   utilizing a non-dedicated telephone line at each remote site, coupled to the public (dial up) switch telephone network, to couple said hub unit to said host computer; and
   utilizing said hub unit to perform a dial-out operation, whenever concentrated data is to be transmitted to said host computer, and selectively arming said hub unit to receive a dial-in-code and inputs from said host computer over said non-dedicated telephone line.

30. A method as set forth in claim 29 further comprising the step of utilizing said hub unit to perform processing control functions for at least one of said spoke meters.

31. A method as set forth in claim 29 further comprising the step of coupling said hub unit to said spoke meter via a set of plug-in communications modules which interface with a set of communications links including RF, hardwire and carrier current links.

32. A method as set forth in claim 31 further comprising the steps of creating and maintaining an error log at said remote site, via said hub unit, capable of being recovered and analyzed by said host computer.

33. A method as set forth in claim 31 further comprising the step of uploading data being monitored by said spoke meters to said hub unit at a preselected polling frequency.

34. A method as set forth in claim 33 further comprising the step of downloading control software from said host computer to said programmable hub unit in a manner that does not require the replacement, reconfiguration or programming of the meters attached to said hub unit.

35. A method as set forth in claim 34 further comprising the step of programming a given spoke meter by downloading software from said host computer to said given spoke meter via said hub unit.

36. A method as set forth in claim 34 wherein the step of utilizing a non-dedicated telephone line at a given remote location is performed in a manner that is transparent to any other user of the same non-dedicated telephone line.

37. A method as set forth in claim 34 which further comprises the steps of:
   (a) providing fault tolerant means for operating the system during AC power failures and at low temperatures; and
   (b) providing means for resetting the system at user preselected intervals and on the occurance of user specified events.

38. A method for operating a distributed monitoring system that includes a host computer located at a central site, a set of spoke meters located at a remote site for monitoring data, and a programmable hub unit located at said remote site, for controlling the collection, concentration and transmission of said monitored data from said remote site to said central site, comprising the steps of:
   monitoring said data via said spoke meters;
   collecting monitored data via said hub unit at a scanning frequency selected in accordance with each of said spoke meters;
   concentrating the data collected by said hub unit for subsequent transmission to said host computer; and
   transmitting said concentrated data collected from said spoke meters to said host computer, by calling out to said host computer in a manner that is transparent to any occupants at a given remote site.

39. A method as set forth in claim 38 further comprising the steps of:
   (a) utilizing a non-dedicated telephone line at said remote site to couple said hub unit and said host computer in a manner transparent to any other user of said non-dedicated line; and
   (b) coupling said hub unit to said spoke meters via a set of plug-in communications modules which, to effect said coupling, in turn interface with a set of communication links, including RF, hardwire and carrier current links.

40. A method as set forth in claim 39 further comprising the step of controlling said hub unit via microprocessor located within the remotely located hub unit.

41. A method as set forth in claim 40 wherein the cycle time of said hub unit may be varied dynamically.

42. A method as set forth in claim 40 wherein said non-dedicated telephone line may be used to download control software for said microprocessor directly from said central site host computer.

43. A method as set forth in claim 42 further comprising the steps of:
   (a) sending a command from said central site host computer to said hub unit;
   (b) measuring the elapsed time between the sending of said command and the receipt of a response by said central site host computer; and
   (c) setting a hub unit clock as a function of said elapsed time measurement.

44. A method as set forth in claim 40 further comprising the step of storing said control software in a CMOS static RAM included in said hub unit.

45. A method as set forth in claim 44 further comprising the steps of storing system configuration parameters, drivers and time stamped event log data in said CMOS RAM.

46. A method as set forth in claim 45 further comprising the steps of segmenting and allocating said CMOS RAM to facilitate the storing of data sets therein that are each uniquely associated with one of said spoke meter device.

47. A method as set forth in claim 45 further comprising the step of storing data in EPROM which facilitates the initialization of said hub unit and which permits said hub unit to perform self diagnostics and initiate communication with said host computer.

48. A method as set forth in claim 47 further comprising the step of performing memory mapping of said EPROM and said CMOS RAM.

49. A method as set forth in claim 45 further comprising the step of storing critical system parameters in EEPROM.

50. A method as set forth in claim 45 further comprising the steps of:
(a) heating hub unit components to permit system operation at remote site temperature levels which would otherwise be below component ratings; and
(b) providing backup battery power for said hub unit in the event of an AC power loss.

* * * * *